(12) United States Patent
Isozu

(10) Patent No.: US 8,150,337 B2
(45) Date of Patent: Apr. 3, 2012

(54) WIRELESS COMMUNICATION DEVICE, COMMUNICATION STATE NOTIFICATION METHOD, WIRELESS COMMUNICATION SYSTEM AND PROGRAM

(75) Inventor: Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 12/328,600

(22) Filed: Dec. 4, 2008

(65) Prior Publication Data

US 2009/0154398 A1 Jun. 18, 2009

(30) Foreign Application Priority Data

Dec. 13, 2007 (JP) ................................ P2007-322458

(51) Int. Cl.
*H03C 1/62* (2006.01)
(52) U.S. Cl. ..................... 455/115.1; 455/423
(58) Field of Classification Search ............... 455/115.1, 455/423, 446, 67.11, 226.1, 404.2, 414.1–414.3, 455/424, 425
See application file for complete search history.

(56) References Cited

U.S. PATENT DOCUMENTS

| | | | | |
|---|---|---|---|---|
| 7,466,964 B2* | 12/2008 | Sondur | ......................... | 455/101 |
| 7,773,985 B2* | 8/2010 | Horton et al. | ................. | 455/423 |
| 7,809,335 B2* | 10/2010 | Yiin et al. | ................... | 455/67.11 |
| 7,860,507 B2* | 12/2010 | Kalika et al. | ................... | 455/446 |
| 7,869,774 B1* | 1/2011 | Parkhurst et al. | ........... | 455/127.1 |

FOREIGN PATENT DOCUMENTS

| | | |
|---|---|---|
| JP | 2005-189960 | 7/2005 |
| JP | 2005-204123 | 7/2005 |
| JP | 2007-104536 | 4/2007 |
| JP | 2007 166189 | 6/2007 |

OTHER PUBLICATIONS

Notification of Reasons For Refusal issued Feb. 9, 2010, with English language translation from the Japanese Patent Office in corresponding Japanese Patent application No. 2007-322458.
Office Action of Japanese Patent Application No. JP 2007-322458, 3 sheets, (Drafting date Oct. 16, 2009).
Sugiura, K. et al., "Improving Discovering Neighbor Node in Ad-Hoc Networks," IPSJ SIG Technical Report, pp. 171-176, (2007).
Application of Network Knowledge, FUJITSU.58, 3, pp. 206-210, (May 2007).

* cited by examiner

*Primary Examiner* — Henry Choe
(74) *Attorney, Agent, or Firm* — Finnegan, Henderson, Farabow, Garrett & Dunner, L.L.P.

(57) ABSTRACT

There is provided a wireless communication device forming an autonomous distributed wireless network by intermittently transmitting and receiving a predetermined communication management signal, which includes a reception portion to receive the communication management signal, an evaluation portion to evaluate a communication state of the wireless communication device in the wireless network based on a history of receiving the communication management signal by the reception portion, and a notification portion to provide a notification corresponding to an evaluation result of the communication state by the evaluation portion.

13 Claims, 14 Drawing Sheets

FIG.5

| TRANSMISSION SOURCE ADDRESS | DESTINATION ADDRESS | COMMUNICATION STATE LIST | POSITIONAL INFORMATION LIST | COMMUNICATION RESERVATION INFORMATION |
|---|---|---|---|---|
| | | | | |

FIG.6

| ADDRESS | RECEIVED SIGNAL STRENGTH (db/m) | HELLO MESSAGE RECEPTION RATE (%) | LINK STATE | COMMUNICATION POSSIBILITY | POSITIONAL INFORMATION |
|---|---|---|---|---|---|
| 20B | 40 | 90 | Poor | OK | cc, dd |
| 20C | 20 | 30 | Bad | NG | ff, gg |
| 20D | 60 | 98 | Good | OK | hh, jj |

FIG.7

| | |
|---|---|
| NUMBER OF COMMUNICATION-POSSIBLE DEVICES | 2 |
| NUMBER OF CONNECTED DEVICES | 3 |

FIG.8

| NUMBER OF COMMUNICATION-POSSIBLE DEVICES | NUMBER OF GOOD LINKS | NUMBER OF POOR LINKS | DISPLAY COLOR | DISPLAY MESSAGE |
|---|---|---|---|---|
| =0 | — | — | BACKGROUND COLOR: RED | NO COMMUNICATION-POSSIBLE DEVICE EXISTS |
| >0 | =0 | >0 | BACKGROUND COLOR: ORANGE | COMMUNICATION IS DIFFICULT |
| | >2 | — | WIRELESS COMMUNICATION DEVICE: YELLOW | COMMUNICATION MAY BECOME UNSTABLE |
| >3 | =0,1 | >0 | WIRELESS COMMUNICATION DEVICE: YELLOW | COMMUNICATION MAY BECOME UNSTABLE |
| | >1 | — | WIRELESS COMMUNICATION DEVICE: GREEN | COMMUNICATION IS STABLE |
| >5 | =0,1,2 | >0 | WIRELESS COMMUNICATION DEVICE: YELLOW | COMMUNICATION MAY BECOME UNSTABLE |
| | >2 | — | WIRELESS COMMUNICATION DEVICE: BLUE | COMMUNICATION IS HIGHLY STABLE |
| >10 | >10 | — | WIRELESS COMMUNICATION DEVICE: RED | NUMBER OF WIRELESS COMMUNICATION DEVICES MAY EXCEED CAPACITY |

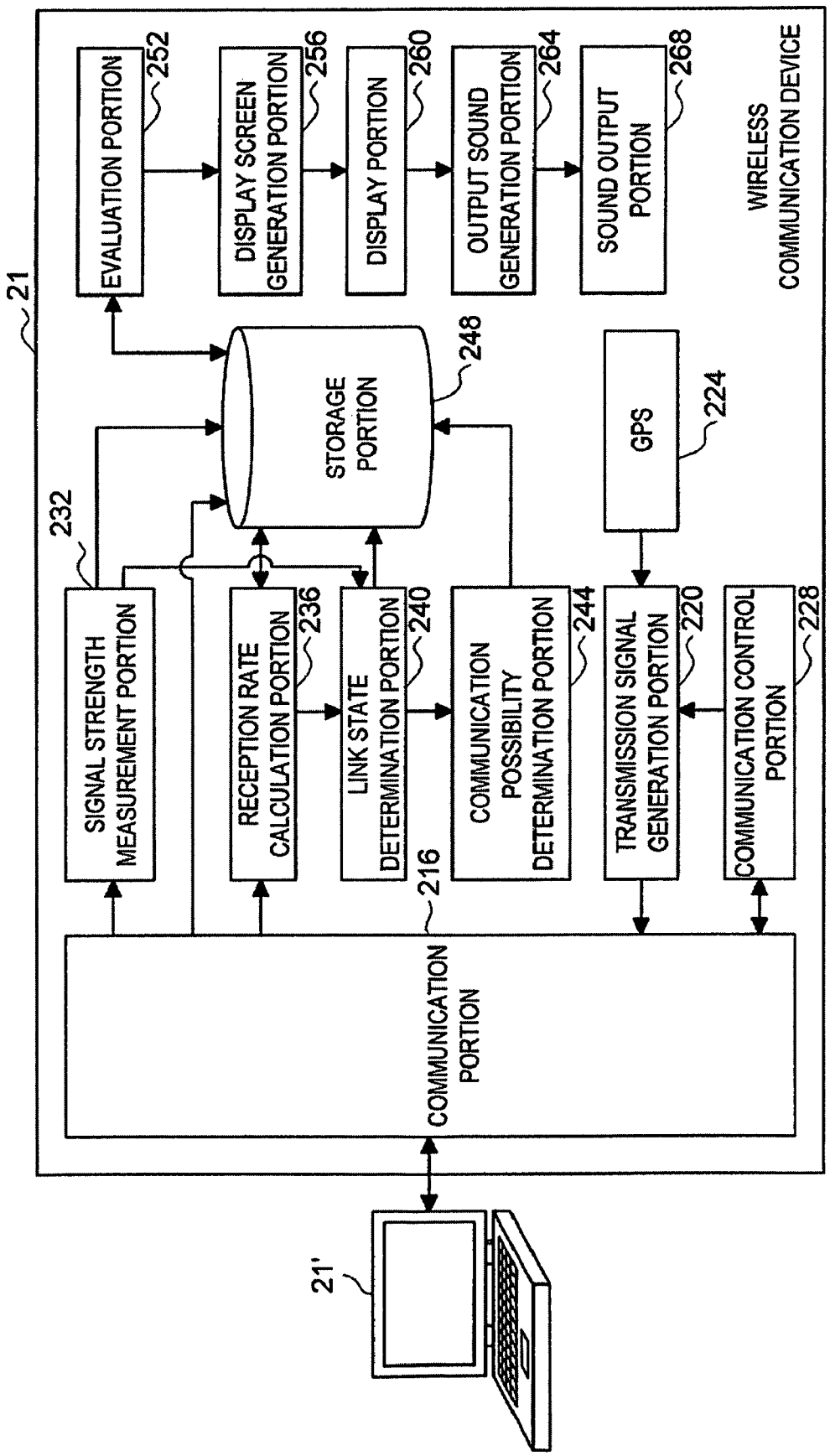

FIG. 16

| NUMBER OF COMMUNICATION-POSSIBLE DEVICES | NUMBER OF DEVICES AT RSSI>50(db/m) | DISPLAY COLOR | DISPLAY MESSAGE | SOUND |
|---|---|---|---|---|
| =0 | - | BACKGROUND COLOR: RED | NO COMMUNICATION-POSSIBLE DEVICE EXISTS | BEEP (WARNING PATTERN 1) |
| >0 | =0 | BACKGROUND COLOR: ORANGE | COMMUNICATION IS DIFFICULT | THREE BLEEPS (SOUND PATTERN 1) |
| | >0 | WIRELESS COMMUNICATION DEVICE: YELLOW | COMMUNICATION MAY BECOME UNSTABLE | TWO BLEEPS (SOUND PATTERN 2) |
| >3 | =0,1 | WIRELESS COMMUNICATION DEVICE: YELLOW | COMMUNICATION MAY BECOME UNSTABLE | TWO BLEEPS (SOUND PATTERN 2) |
| | >1 | WIRELESS COMMUNICATION DEVICE: GREEN | COMMUNICATION IS STABLE | ONE BLEEP (SOUND PATTERN 3) |
| >5 | =0,1,2 | WIRELESS COMMUNICATION DEVICE: YELLOW | COMMUNICATION MAY BECOME UNSTABLE | TWO BLEEPS (SOUND PATTERN 2) |
| | >2 | WIRELESS COMMUNICATION DEVICE: BLUE | COMMUNICATION IS HIGHLY STABLE | NO SOUND |

WIRELESS COMMUNICATION DEVICE, COMMUNICATION STATE NOTIFICATION METHOD, WIRELESS COMMUNICATION SYSTEM AND PROGRAM

CROSS REFERENCES TO RELATED APPLICATIONS

The present invention contains subject matter related to Japanese Patent Application JP 2007-322458 filed in the Japan Patent Office on Dec. 13, 2007, the entire contents of which being incorporated herein by reference.

BACKGROUND OF THE INVENTION

1. Field of the Invention

The present invention relates to a wireless communication device, a communication state notification method, a wireless communication system and a program.

2. Description of the Related Art

Recently, the standardization of a mesh network has been promoted by groups such as IETF MANET (Internet Engineering Task Force, Mobile Ad-hoc Networks) and IEEE 802.11s.

A mesh network allows a plurality of wireless communication devices to communicate with each other without depending on an access point, differently from an infrastructure mode. It is thereby possible in the mesh network to place the wireless communication devices without consideration of the positional relationship with an access point. However, depending on the placement positions of the wireless communication devices, a wireless communication device which a radio signal from another wireless communication device does not reach and thus remains isolated or a spot where traffic is concentrated may exist, which inhibits normal wireless communication.

In light of this issue, it is important to let a user grasp the communication state of each wireless communication device as a way to place each wireless communication device in an appropriate position in the mesh network. In regard to this, an information processing device that displays the configuration of a network for a user is disclosed in Japanese Unexamined Patent Application Publication No. 2005-189960, for example.

SUMMARY OF THE INVENTION

However, the above information processing device displays the configuration of the network that is connected by wire. On the other hand, the wireless communication devices that form the mesh network, which is a wireless network, are connected wirelessly, and therefore the information processing device cannot notify a user of the communication state of each wireless communication device.

In view of the foregoing, it is desirable to provide a novel and improved wireless communication device, a communication state notification method, a wireless communication system and a program capable of notifying the communication state of a wireless communication device that forms a wireless network.

According to an embodiment of the present invention, there is provided a wireless communication device forming an autonomous distributed wireless network by intermittently transmitting and receiving a predetermined communication management signal, which includes a reception portion to receive the communication management signal, an evaluation portion to evaluate a communication state of the wireless communication device in the wireless network based on a history of receiving the communication management signal by the reception portion, and a notification portion to provide a notification corresponding to an evaluation result of the communication state by the evaluation portion.

In such a configuration, the evaluation portion evaluates the communication state of the wireless communication device in the wireless network based on the history of receiving the communication management signal by the reception portion, and the notification portion provides a notification corresponding to the evaluation result of the communication state of the wireless communication device. The wireless communication device thereby allows a user of the wireless communication device to easily grasp the communication state of the wireless communication device. Therefore, the wireless communication device contributes to the appropriate placement of each wireless communication device in the wireless network by a user.

The evaluation portion may evaluate that the communication state is more suitable as a reception success rate of the communication management signal from each peripheral wireless communication device by the reception portion is higher. It is assumed that the reception success rate of the communication management signal is higher as a communication link with another wireless communication device is more suitable. Thus, if the evaluation portion evaluates that the communication state is more suitable as the reception success rate of the communication management signal is higher as described above, the notification portion can provide an appropriate notification to a user.

The evaluation portion may evaluate that the communication state is more suitable as a variation of an interval of receiving the communication management signal transmitted from each peripheral wireless communication device by the reception portion is smaller. It is assumed that the variation of the interval of receiving the communication management signal by the reception portion is smaller as a communication link with another wireless communication device is more stable. Thus, if the evaluation portion evaluates that the communication state is more suitable as the variation of the interval of receiving the communication management signal by the reception portion is smaller as described above, the notification portion can provide an appropriate notification to a user.

The evaluation portion may determine a connection relationship with each peripheral wireless communication device based on a history of receiving the communication management signal transmitted from each peripheral wireless communication device by the reception portion and may evaluate that the communication state is more suitable as the number of peripheral wireless communication devices with the connection relationship determined to satisfy a predetermined condition is larger.

The evaluation portion may evaluate that the communication state of the wireless communication device is abnormal if the number of peripheral wireless communication devices with the connection relationship determined to satisfy a predetermined condition exceeds a predetermined number. If an excessive number of wireless communication device are concentrated on one area, traffic is also concentrated, which inhibits normal wireless communication. By implementing the above function in the evaluation portion, the notification portion can provide a notification that the communication state is abnormal if the number of peripheral wireless communication devices exceeds a predetermined number.

The notification portion may generate a display screen corresponding to the evaluation result of the communication state by the evaluation portion. Such a configuration allows a user to grasp the communication state of the wireless communication device through the display screen.

The display screen may contain a display indicating the wireless communication device and a peripheral wireless communication device, and the notification portion may change a color of the display indicating the wireless communication device corresponding to the evaluation result of the communication state by the evaluation portion. Such a configuration allows a user to grasp the communication state of the wireless communication device based on the display color of the wireless communication device.

The notification portion may change a background color of the display screen corresponding to the evaluation result of the communication state by the evaluation portion. Such a configuration allows a user to grasp the communication state of the wireless communication device based on the background color of the display screen.

The notification portion may output a sound corresponding to the evaluation result of the communication state by the evaluation portion. Such a configuration allows a user to grasp the communication state of the wireless communication device based on the sound.

The wireless communication device may further include a storage medium to store the history of receiving the communication management signal by the reception portion.

According to another embodiment of the present invention, there is provided a communication state notification method performed in a wireless communication device forming an autonomous distributed wireless network by intermittently transmitting and receiving a predetermined communication management signal, which includes the steps of receiving the communication management signal, evaluating a communication state of the wireless communication device in the wireless network based on a history of receiving the communication management signal, and providing a notification corresponding to an evaluation result of the communication state.

According to another embodiment of the present invention, there is provided a wireless communication system including a plurality of wireless communication devices forming an autonomous distributed wireless network by intermittently transmitting and receiving a predetermined communication management signal, each wireless communication device including a reception portion to receive the communication management signal, an evaluation portion to evaluate a communication state of the wireless communication device in the wireless network based on a history of receiving the communication management signal by the reception portion, and a notification portion to provide a notification corresponding to an evaluation result of the communication state by the evaluation portion.

According to another embodiment of the present invention, there is provided a program causing a computer to function as a wireless communication device forming an autonomous distributed wireless network by intermittently transmitting and receiving a predetermined communication management signal, the wireless communication device including an evaluation portion to evaluate a communication state of the wireless communication device in the wireless network based on a history of receiving the communication management signal, and a notification portion to provide a notification corresponding to an evaluation result of the communication state by the evaluation portion.

The above program may cause a computer hardware resource that includes CPU, ROM, RAM or the like to execute the function of the evaluation portion and the notification portion described above. It is thereby possible to allow a computer that implements the program to function as the above-described wireless communication device.

According to the embodiments of the present invention described above, it is possible to notify the communication state of the wireless communication device that forms the wireless network.

BRIEF DESCRIPTION OF THE DRAWINGS

FIG. 5 is an explanatory view showing an example of the structure of a hello message.

FIG. 6 is an explanatory view showing a specific example of a nearby device list.

FIG. 7 is an explanatory view showing a specific example of the number of communication-possible devices and the number of connected devices stored in a storage portion.

FIG. 8 is an explanatory view showing a specific example of a communication state evaluation table.

FIG. 15 is a functional block diagram showing the configuration of a wireless communication device according to a second embodiment.

FIG. 16 is an explanatory view showing a specific example of a communication state determination table according to the second embodiment.

DETAILED DESCRIPTION OF THE PREFERRED EMBODIMENTS

Figure 1:
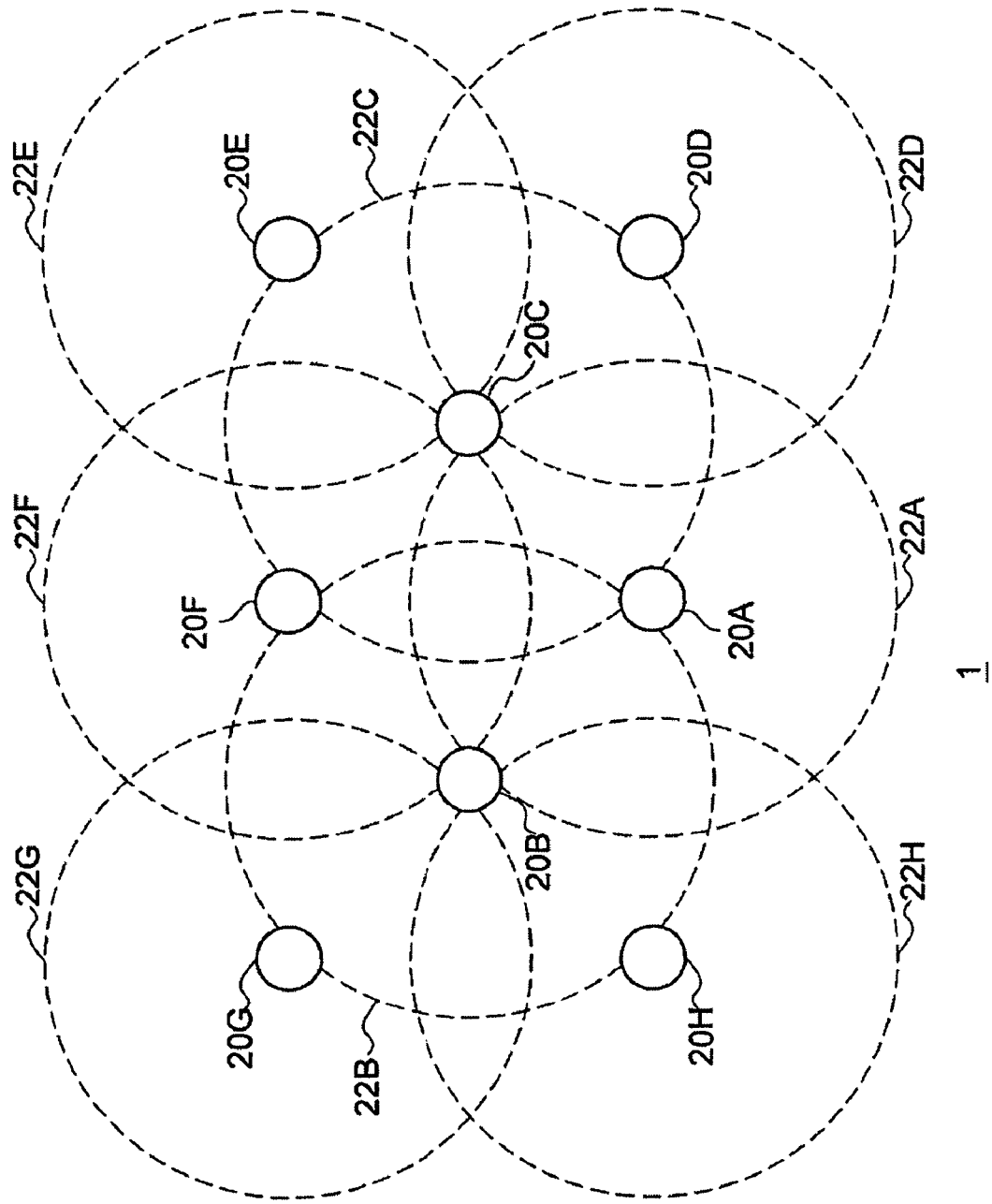
FIG. 1 is an explanatory view showing the configuration of a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described in the following order:

(1) Outline of the wireless communication system according to an embodiment (2) Wireless communication device according to the first embodiment (2-1) Hardware configuration of the wireless communication device according to the first embodiment (2-2) Function of the wireless communication device according to the first embodiment (2-3) Operation of the wireless communication device according to the first embodiment (3) Wireless communication device according to the second embodiment (4) Summary (1) Outline of the Wireless Communication System According to an Embodiment A wireless communication system 1 according to an embodiment is schematically described hereinafter with reference to FIG. 1.

FIG. 1 is an explanatory view showing the configuration of the wireless communication system 1 according to the embodiment. Referring to FIG. 1, the wireless communication system 1 includes a plurality of wireless communication devices 20A to 20H. In FIG. 1, radio signal ranges 22A to 22H of the wireless communication devices 20A to 20H are indicated by dotted lines. In the following description, if there is no particular need to distinguish among the wireless communication devices 20A to 20H, they are collectively referred to simply as the wireless communication device 20, without affixing the capital letter to the symbol. This is the same for the radio signal ranges 22A to 22H.

In the wireless communication system 1 shown in FIG. 1, the wireless communication devices 20B and 20C are placed within the radio signal range 22A of the wireless communication device 20A. Likewise, the wireless communication devices 20A, 20F, 20G and 20H are placed within the radio signal range 22B of the wireless communication device 20B, and the wireless communication devices 20A, 20D, 20E and 20F are placed within the radio signal range 22C of the wireless communication device 20C.

Further, the wireless communication device 20C is placed within the radio signal range 22D of the wireless communication device 20D, the wireless communication device 20C is placed within the radio signal range 22E of the wireless communication device 20E, and the wireless communication devices 20B and 20C are placed within the radio signal range 22F of the wireless communication device 20F. Likewise, the wireless communication device 20B is placed within the radio signal range 22G of the wireless communication device 20G, and the wireless communication device 20B is placed within the radio signal range 22H of the wireless communication device 20H.

The wireless communication devices 20A to 20H receive a hello message as an example of communication management information at a predetermined interval and create a mesh network. The detail of the hello message is described later with reference to FIG. 5. The wireless communication devices 20A to 20H that form the mesh network can transmit and receive various kinds of data. Examples of such data are music data such as music, a lecture and a radio program, video data such as a movie, a television program, a video program, a photograph, a document, a picture and a chart, given data such as a game and software, and so on.

In this manner, in the wireless communication system 1 shown in FIG. 1, a wireless communication device that is isolated in terms of radio communication does not exist, and each wireless communication device 20 is placed in an appropriate position for forming a mesh network (Ad-hoc network). Note that because FIG. 1 shows the wireless communication system 1 and, at the same time, shows the mesh network, the wireless communication system 1 and the mesh network can be thought of as being almost synonymous with each other. However, because the term "network" generally refers to a structure that includes a link in addition to a node (wireless communication device), the mesh network can be also thought of as being different from the wireless communication system 1 in that the mesh network includes a link in addition to the wireless communication devices 20A to 20H.

The wireless communication device 20 may be information processing devices such as a PC (Personal Computer), a home video processing unit (e.g. a DVD recorder, a videocassette recorder etc.), a cellular phone, a PHS (Personal Handyphone System), a portable sound playback unit, a portable video processing unit, a PDA (Personal Digital Assistants), a home game device, a portable game device, and an electrical household appliance.

Figure 2:
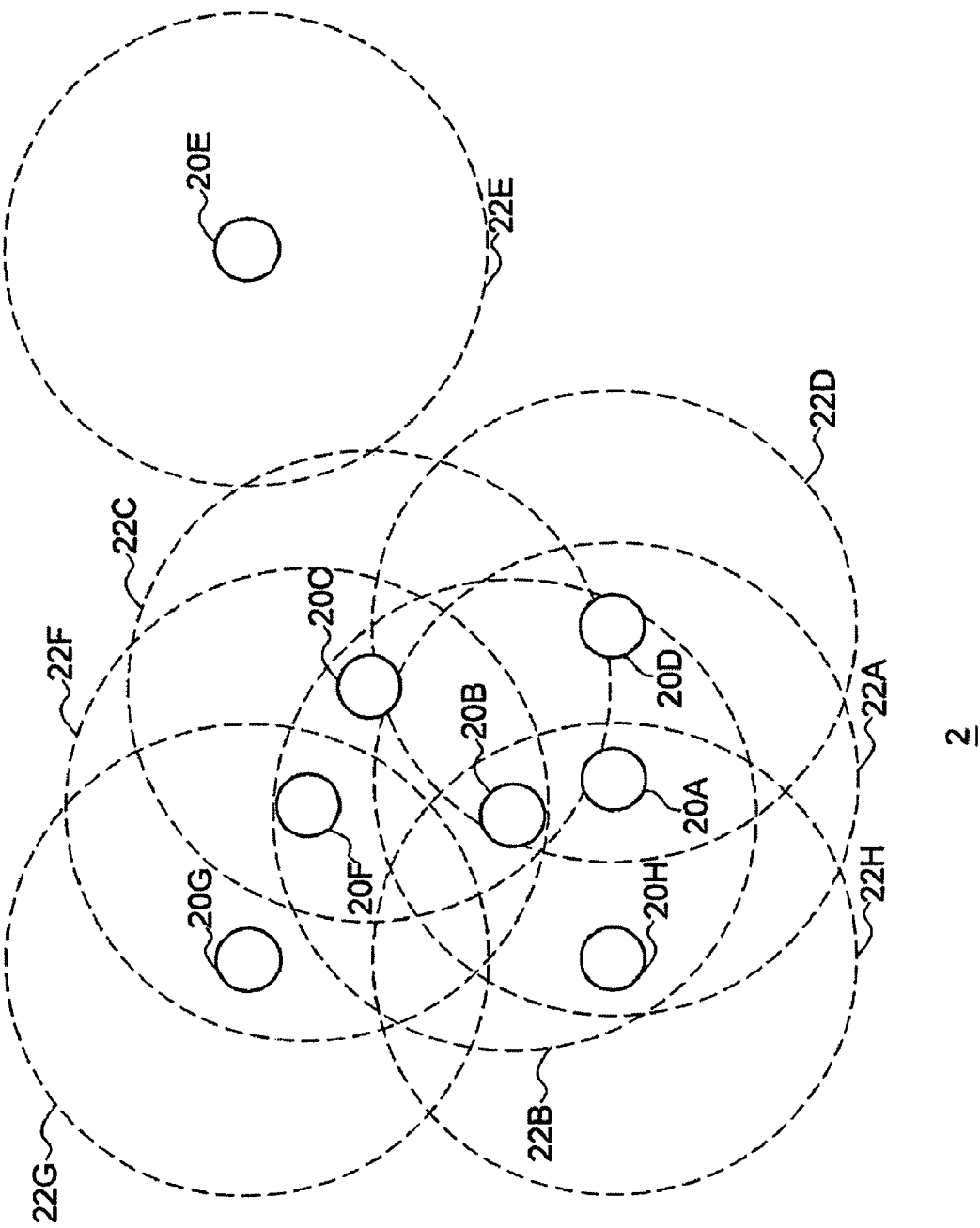
FIG. 2 is an explanatory view showing an example of the arrangement of wireless communication devices.

On the other hand, in another case, the wireless communication devices 20A to 20H are placed as shown in FIG. 2.

FIG. 2 is an explanatory view showing an example of the arrangement of the wireless communication devices 20A to 20H. In the arrangement example shown in FIG. 2, no other wireless communication device 20 exists within the radio signal range 22E of the wireless communication device 20E. On the other hand, the wireless communication device 20B is included within the radio signal ranges of the five wireless communication devices 20A, 20D, 20C, 20F and 20H, and, in such a case, interference occurs in the vicinity of the wireless communication device 20B.

Therefore, it is desired to place the wireless communication devices 20A to 20H in appropriate positions as shown in FIG. 1. To that end, it is effective to let a user grasp the communication states of the wireless communication devices 20A to 20H.

Given such circumstances, the wireless communication device according to the embodiment has been invented. The wireless communication device 20 according to the embodiment is capable of notifying a user of the communication state in the mesh network. The wireless communication device 20 is described in detail hereinbelow.

Figure 3:
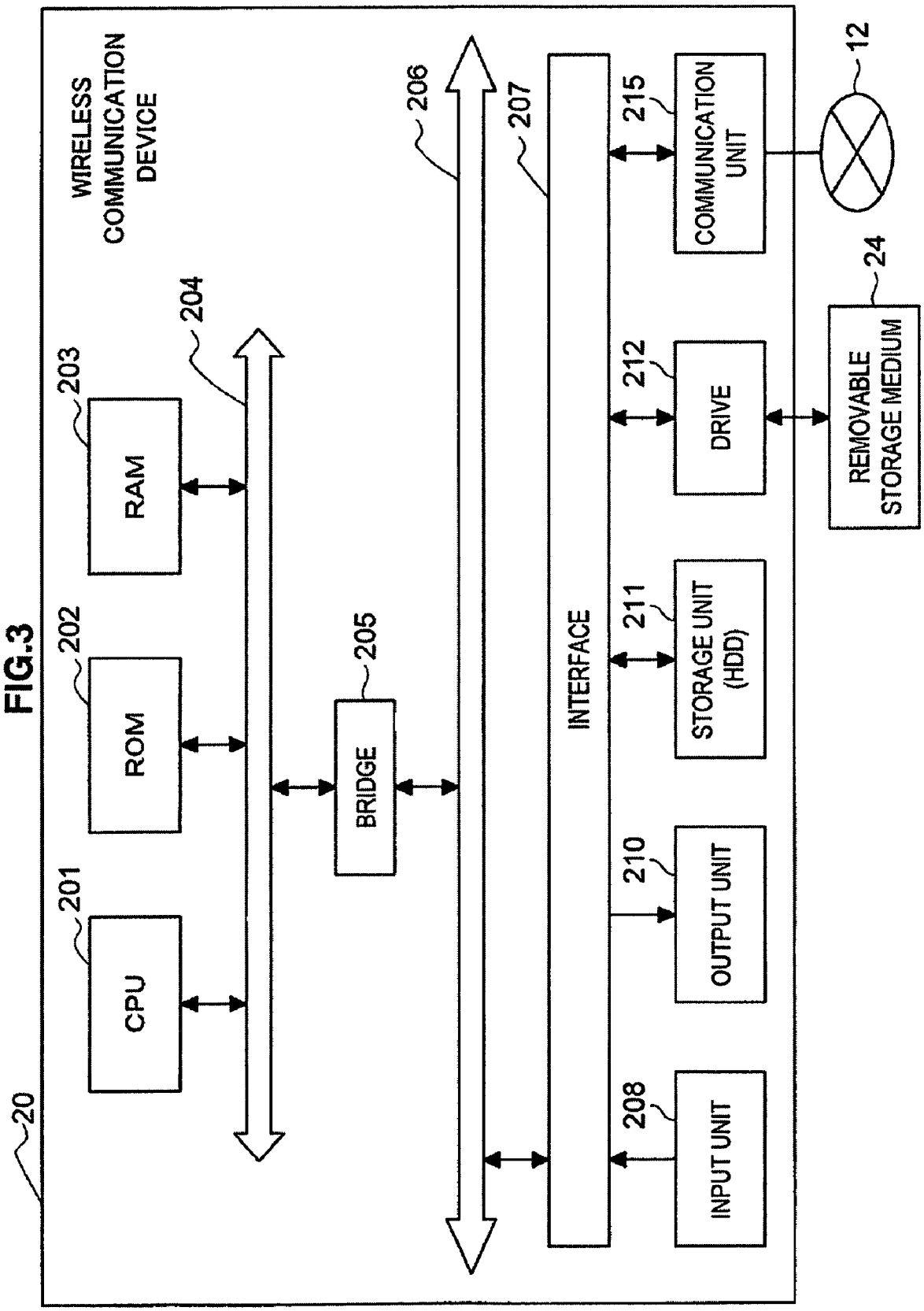
FIG. 3 is a block diagram showing the hardware configuration of a wireless communication device.

(2) Wireless Communication Device According to the First Embodiment (2-1) Hardware Configuration of the Wireless Communication Device According to the First Embodiment FIG. 3 is a block diagram showing the hardware configuration of the wireless communication device 20. The wireless communication device 20 includes a CPU (Central Processing Unit) 201, ROM (Read Only Memory) 202, RAM (Random Access Memory) 203, a host bus 204, a bridge 205, an external bus 206, an interface 207, an input unit 208, an output unit 210, a storage unit (HDD) 211, a drive 212, and a communication unit 215.

The CPU 201 functions as a processing unit and a control unit, and it controls the overall operation in the wireless communication device 20 according to each program. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected with each other through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented on a single bus.

The input unit 208 may include an input means for a user to input information, such as a mouse, a keyboard, a touch panel, a button, a microphone, a switch or a lever, and an input control circuit that generates an input signal based on user input and outputs it to the CPU 201, for example. A user of the wireless communication device 20 manipulates the input unit 208 to thereby input various kinds of data or direct processing operation to the wireless communication device 20.

The output unit 210 may include a display device such as a CRT (Cathode Ray Tube) display device, an LCD (Liquid Crystal Display) device, an OLED (Organic Light Emitting Display) device or a lamp, and a sound output device such as a speaker or a headphone, for example. The output unit 210 may output reproduced contents, for example. Specifically, the display device displays various kinds of information such as reproduced or generated video data by a text or an image. The sound output device converts reproduced or generated sound data or the like into a sound and outputs it.

The storage unit 211 is a device for data storage that is configured as an example of a storage portion of the wireless communication device 20 according to this embodiment. The storage unit 211 may include a storage medium, a recording device that records data into the storage medium, a reading device that reads data from the storage medium, a deleting device that deletes data recorded in the storage medium and so on. The storage unit 211 may be composed of an HDD (Hard Disc Drive). The storage unit 211 drives a hard disk and stores a program to be executed by the CPU 201 or various kinds of data. A nearby device list, which is described later, and so on are recorded in the storage unit 211.

The drive 212 is a reader/writer for a storage medium, and it may be built in the wireless communication device 20 or attached externally. The drive 212 reads information that is recorded in a removable storage medium 24 such as a magnetic disk, an optical disk, a magneto-optical disk or a semiconductor memory that is attached thereto and outputs the information to the RAM 203.

The communication unit 215 may be a communication interface that is configured by a communication device or the like for establishing connection with a communication network 12. The communication unit 215 may be a communication device compatible with a wireless LAN (Local Area Network), a communication device compatible with a wireless USB, or a wired communication device that performs communication by wire. The communication unit 215 transmits and receives various kinds of data with another wireless communication device 20'.

(2-2) Function of the Wireless Communication Device According to the First Embodiment The hardware configuration of the wireless communication device 20 is described in the foregoing with reference to FIG. 3. In the following, the function of the wireless communication device 20 is described with reference to FIGS. 4 to 13.

Figure 4:
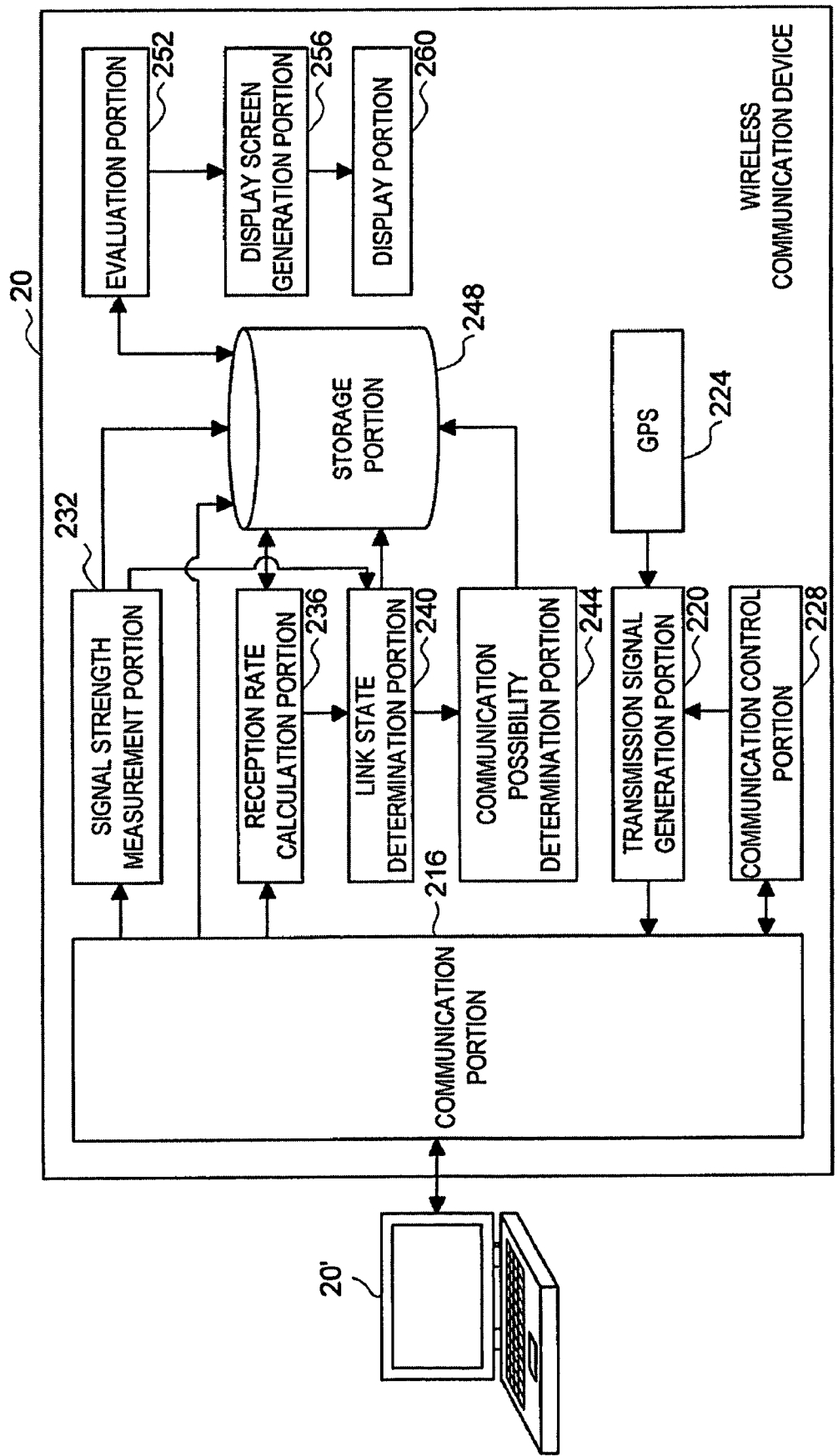
FIG. 4 is a functional block diagram showing the configuration of a wireless communication device according to a first embodiment.

FIG. 4 is a functional block diagram showing the configuration of the wireless communication device 20 according to the first embodiment. Referring to FIG. 4, the wireless communication device 20 includes a communication portion 216, a transmission signal generation portion 220, a GPS (Global Positioning System) 224, a communication control portion 228, a signal strength measurement portion 232, a reception rate calculation portion 236, a link state determination portion 240, a communication possibility determination portion 244, a storage portion 248, an evaluation portion 252, a display screen generation portion 256, and a display portion 260.

The communication portion 216 is an interface with a peripheral wireless communication device 20', and it has a function as a reception portion and a transmission portion that transmits and receives various kinds of signals and data to and from the peripheral wireless communication device 20'. For example, the communication portion 216 down-converts a radio signal that is received from the peripheral wireless communication device 20' or transmits a transmission signal that is generated by the transmission signal generation portion 220 as a radio signal. The radio signal that is transmitted and received by the communication portion 216 includes a hello message.

The transmission signal generation portion 220 generates various kinds of signals to be transmitted via the communication portion 216. For example, the transmission signal generation portion 220 generates the hello message shown in FIG. 5.

FIG. 5 is an explanatory view showing the structure of the hello message. Referring to FIG. 5, the hello message contains a transmission source address 32, a destination address 34, a communication state list 36, a positional information list 38, and communication reservation information 40.

The transmission source address 32 is the address of the wireless communication device 20 that transmits the hello message. The destination address 34 is the address of the wireless communication device 20' to receive the hello message. Because one of the purposes that the wireless communication device 20 transmits the hello message is to let the surroundings know the presence of itself, a broadcast address, for example, is described in the destination address 34.

The communication state list 36 is information that indicates the communication state of the wireless communication device 20 and the communication state of another wireless communication device 20'. The communication state of another wireless communication device 20' can be extracted from the communication state list 36 that is contained in the hello message received from the wireless communication device 20'. The communication state list 36 may be represented in bitmap format.

The positional information list 38 is information that indicates the positional information of the wireless communication device 20 and the positional information of another wireless communication device 20'. The positional information of the wireless communication device 20 can be acquired from a satellite by the GPS 224. The positional information of another wireless communication device 20' can be extracted from the positional information list 38 that is contained in the hello message received from the wireless communication device 20'. The positional information may contain latitude information and longitude information, for example.

The communication reservation information 40 is information for reserving a time slot for the wireless communication device 20 to perform communication in the case where the mesh network operates based on time-shared control. Thus, the communication reservation information 40 may contain a set of the address of a device with which communication will be performed and a time slot to be reserved for the communication.

Referring back to FIG. 4 showing the configuration of the wireless communication device 20, the communication control portion 228 directs the communication portion 216 to perform transmission or reception. For example, in the case where the transmission/reception period (beacon period) of the hello message occurs at a predetermined time interval (super frame interval), the communication control portion 228 controls the communication portion 216 to transmit the hello message that is generated by the transmission signal generation portion 220 during the hello message transmission time slot of the wireless communication device 20. On the other hand, the communication control portion 228 controls the communication portion 216 to receive the hello message that is transmitted from the surroundings during time slots different from the hello message transmission time slot of the wireless communication device 20.

The signal strength measurement portion 232 measures the signal strength (RSSI: Received Signal Strength Indicator) of the hello message that is received by the communication portion 216. Then, the signal strength measurement portion 232 records the measured signal strength or the average of the signal strength into the storage portion 248 for each hello message transmission source device.

The reception rate calculation portion 236 calculates the reception success rate of the hello message that is periodically transmitted from the peripheral wireless communication device 20' and received by the communication portion 216. For example, because the interval that the hello message is transmitted is known, the reception rate calculation portion 236 may calculate the reception success rate of the hello message by the communication portion 216 based on the number of hello messages that are received during a predetermined period. The reception success rate that is calculated by the reception rate calculation portion 236 is recorded into the storage portion 248 for each hello message transmission source device. The determination whether the reception is successful or not may be made based on whether an error is detected in the hello message by FCS (Frame Check Sequence) that is contained in the hello message.

The link state determination portion 240 determines the link (channel) state with the wireless communication device 20 for each hello message transmission source device based on the signal strength measured by the signal strength measurement portion 232 and the reception rate calculated by the reception rate calculation portion 236. For example, the link state determination portion 240 determines which of three (Good, Poor and Bad) levels the link state applies.

Specifically, the link state determination portion 240 may determine that the link state with the relevant wireless communication device 20' is Good if the reception signal strength is equal to or higher than a first strength (e.g. 60 db/m) and the reception rate of the hello message is equal to or higher than a first reception rate (e.g. 90%). Further, the link state determination portion 240 may determine that the link state is Poor if either one of the conditions that the received signal strength is equal to or higher than the first strength or that the reception rate of the hello message is equal to or higher than the first reception rate is satisfied. Furthermore, the link state determination portion 240 may determine that the link state is Bad if the received signal strength is lower than the first strength and the reception rate of the hello message is lower than the first reception rate.

Alternatively, the link state determination portion 240 may determine the link state with the relevant wireless communication device 20' based on the total sum of a strength evaluation value corresponding to the level of the received signal strength and a reception rate evaluation value corresponding to the reception rate of the hello message. For example, the link state determination portion 240 may determine that the link state is Good if the total sum of the strength evaluation value and the reception rate evaluation value is equal to or higher than a first threshold, that the link state is Bad if the total sum is equal to or lower than a second threshold, and that the link state is Poor if the total sum is between the first threshold and the second threshold.

The communication possibility determination portion 244 determines whether communication with each wireless communication device 20' is possible or not based on the link state with each wireless communication device 20' that is determined by the link state determination portion 240. For example, the communication possibility determination portion 244 may determine that communication with the wireless communication device 20' with which the link state is Good or Poor is possible and that communication with the wireless communication device 20' with which the link state is Bad is difficult as a predetermined condition.

The storage portion 248 stores the received signal strength that is measured by the signal strength measurement portion 232, the reception rate that is calculated by the reception rate calculation portion 236, the link state that is determined by the link state determination portion 240, and the communication possibility that is determined by the communication possibility determination portion 244 as a nearby device list for each hello message transmission source device. The received signal strength measured by the signal strength measurement portion 232, the reception rate calculated by the reception rate calculation portion 236, the link state determined by the link state determination portion 240 and the communication possibility determined by the communication possibility determination portion 244 and so on are used as a history of receiving the hello message by the communication portion 216.

FIG. 6 is an explanatory view showing a specific example of the nearby device list. Referring to FIG. 6, the nearby device list contains the address, the received signal strength, the hello message reception rate, the link state, the communication possibility and the positional information. Specifically, the wireless communication device 20B with the address "20B" (in this description, the symbol of the wireless communication device coincides with the address for convenience of description) is associated with the received signal strength "40", the hello message reception rate "90", the link state "Poor", the communication possibility "OK" and the positional information "cc, dd".

Further, the storage portion 248 stores the number of devices with the communication possibility "OK" and the number of devices as the transmission source of the hello message that is received by the communication portion 216 as shown in FIG. 7.

FIG. 7 is an explanatory view showing specific examples of the number of communication-possible devices and the number of connected devices that are stored in the storage portion 248. If the number of devices with the communication possibility "OK" is two (20B and 20D) as shown in FIG. 6, the storage portion 248 stores that the number of communication-possible devices is two. Further, if the number of devices as the transmission source of the hello message that is received by the communication portion 216 is three (20B, 20C and 20D) as shown in FIG. 6, the storage portion 248 stores that the number of connected devices is three.

The storage portion 248 may be nonvolatile memory such as EEPROM (Electrically Erasable Programmable Read-Only Memory) and EPROM (Erasable Programmable Read-Only Memory), magnetic disks such as a hard disk and a discoid magnetic disk, optical discs such as CD-R (Compact Disc Recordable)/RW (ReWritable), DVD-R (Digital Versatile Disc Recordable)/RW/+R/+RW/RAM (Random Access Memory) and BD (Blu-ray Disc (registered trademark))-R/BD-RE, or a storage medium such as MO (Magneto Optical) disk.

The evaluation portion 252 evaluates the communication state of the wireless communication device 20 in the mesh network based on the nearby device list that is stored in the storage portion 248. Then, the display screen generation portion 256 generates a display screen corresponding to the evaluation result of the communication state by the evaluation portion 252, and the display portion 260 displays the display screen that is generated by the display screen generation portion 256. Thus, the display screen generation portion 256 and the display portion 260 have a function as a notification portion that provides a notification corresponding to the evaluation result of the communication state by the evaluation portion 252. Although it is described above that the display screen generation portion 256 generates a display screen, this is equivalent to that the display screen generation portion 256 generates a video signal to be used for displaying a display screen by the display portion 260.

As an example, the wireless communication device 20 retains a communication state evaluation table as shown in FIG. 8, and the evaluation portion 252 evaluates the communication state of the wireless communication device 20 based on the communication state evaluation table.

FIG. 8 is an explanatory view showing a specific example of the communication state evaluation table. Referring to FIG. 8, in the communication state evaluation table, a display color and a display message are associated with a combination of the number of communication-possible devices, the number of Good links and the number of Poor links. The evaluation portion 252 evaluates to which row of the communication state evaluation table the number of communication-possible devices, the number of links with the Good link state and the number of links with the Poor link state correspond. Then, the display screen generation portion 256 generates a display screen that contains the information associated with the row that is determined to correspond by the evaluation portion 252.

According to the communication state evaluation table, the communication state is basically evaluated to be more suitable as the number of Good links is larger if the other conditions are the same. Because the number of Good links depends on the reception rate of the hello message, the evaluation portion 252 evaluates that the communication state of the wireless communication device 20 is more suitable as the reception rate of the hello message is higher.

However, if the number of communication-possible devices or the number of Good links is larger than a predetermined number, it is evaluated that the number of wireless communication devices 20 may exceed a capacity as shown in the bottom row of the communication state evaluation table. When it is determined that the capacity is exceeded (the communication state is abnormal) based on the number, this may be indicated on a display by changing the background color of the display screen, changing the display color of an icon or the like of each wireless communication device 20, or displaying a message indicating the situation, for example, as described later. Specific examples of the evaluation of the communication state using the communication state evaluation table and the notification method are described hereinafter with reference to FIGS. 9 to 13.

Figure 9:
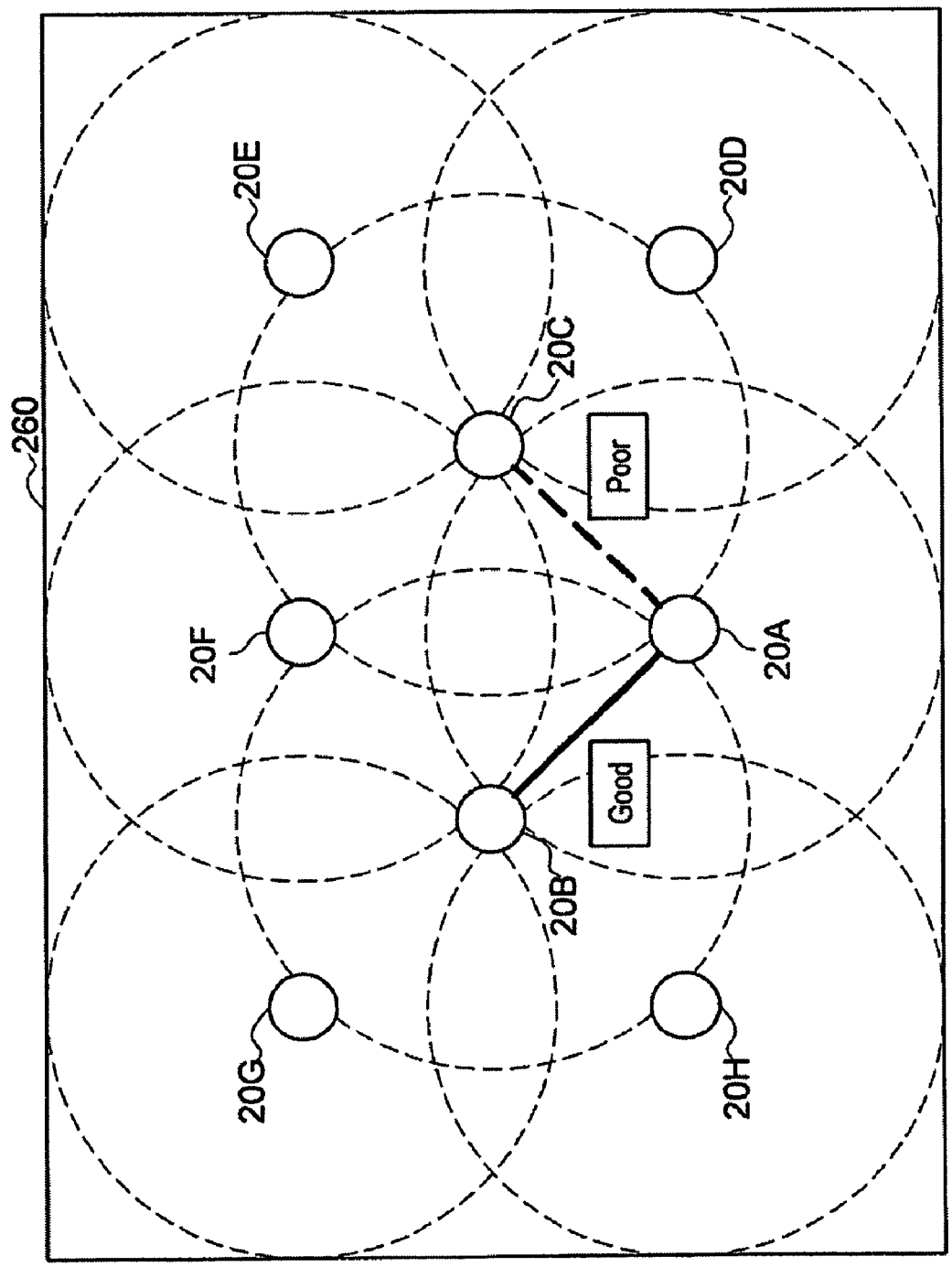
FIG. 9 is an explanatory view showing an example of a display screen displayed by a display portion.

FIG. 9 is an explanatory view showing an example of the display screen displayed by the display portion 260. Specifically, it shows the display screen in the case where the number of communication-possible devices for the wireless communication device 20A is two (the wireless communication devices 20B and 20C), the link between the wireless communication devices 20A and 20B is Good, and the link between the wireless communication devices 20A and 20C is Poor. Although the display screen shown in FIG. 9 is assumed to be the one that is displayed on the display portion 260 placed in the wireless communication device 20A, the display screen may be displayed on the display portion 260 of the other wireless communication devices 20B to 20H or a display device outside the mesh network. The displayed positions of the wireless communication devices 20A to 20H on the display screen may be determined based on the positional information list 38 that is contained in the hello message.

In the state shown in FIG. 9, the communication state of the wireless communication device 20A is evaluated to correspond to the third row of the communication state evaluation table. If the number of Good links is only one, the dependence on the device on the other end of the Good link is high. Accordingly, the display screen generation portion 256 generates the display screen as shown in FIG. 10.

Figure 10:
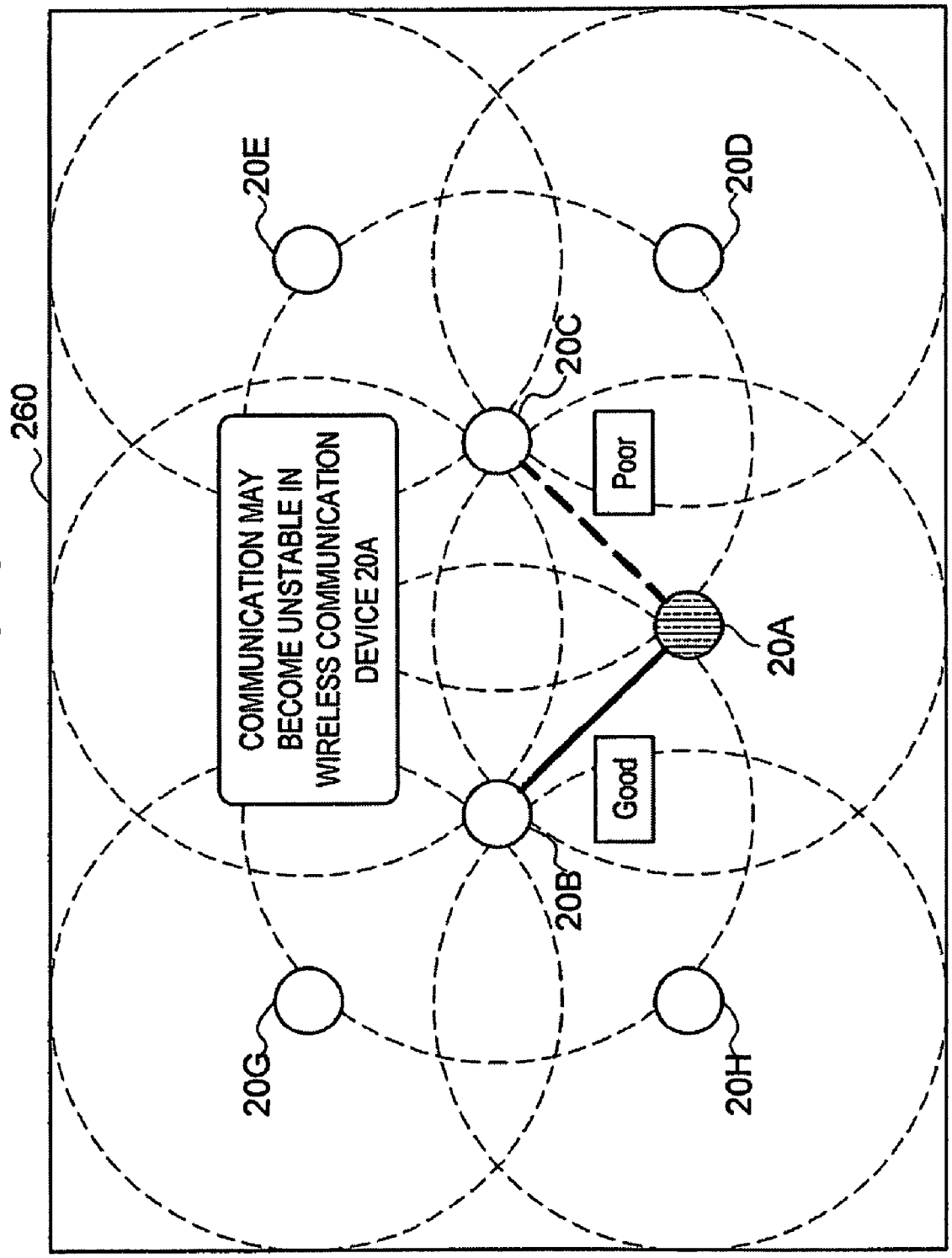
FIG. 10 is an explanatory view showing another example of a display screen displayed by a display portion.

FIG. 10 is an explanatory view showing another example of the display screen displayed by the display portion 260. As shown in FIG. 10, the display screen generation portion 256 sets the display color of the wireless communication device 20A to yellow and superimposes the message "communication may become unstable in the wireless communication device 20A" on the display screen.

Such a configuration allows a user of the wireless communication device 20A to be informed that the communication state of the wireless communication device 20A is unstable and to improve the placement position of the wireless communication device 20A. Although the Good link and the Poor link are differentiated by the solid line and the dotted line in the examples of FIGS. 9 and 10, this embodiment is not limited thereto. For example, the Good link and the Poor link may be differentiated by a line shape, a line width, a line color, a line transparency, a symbol and so on.

Figure 11:
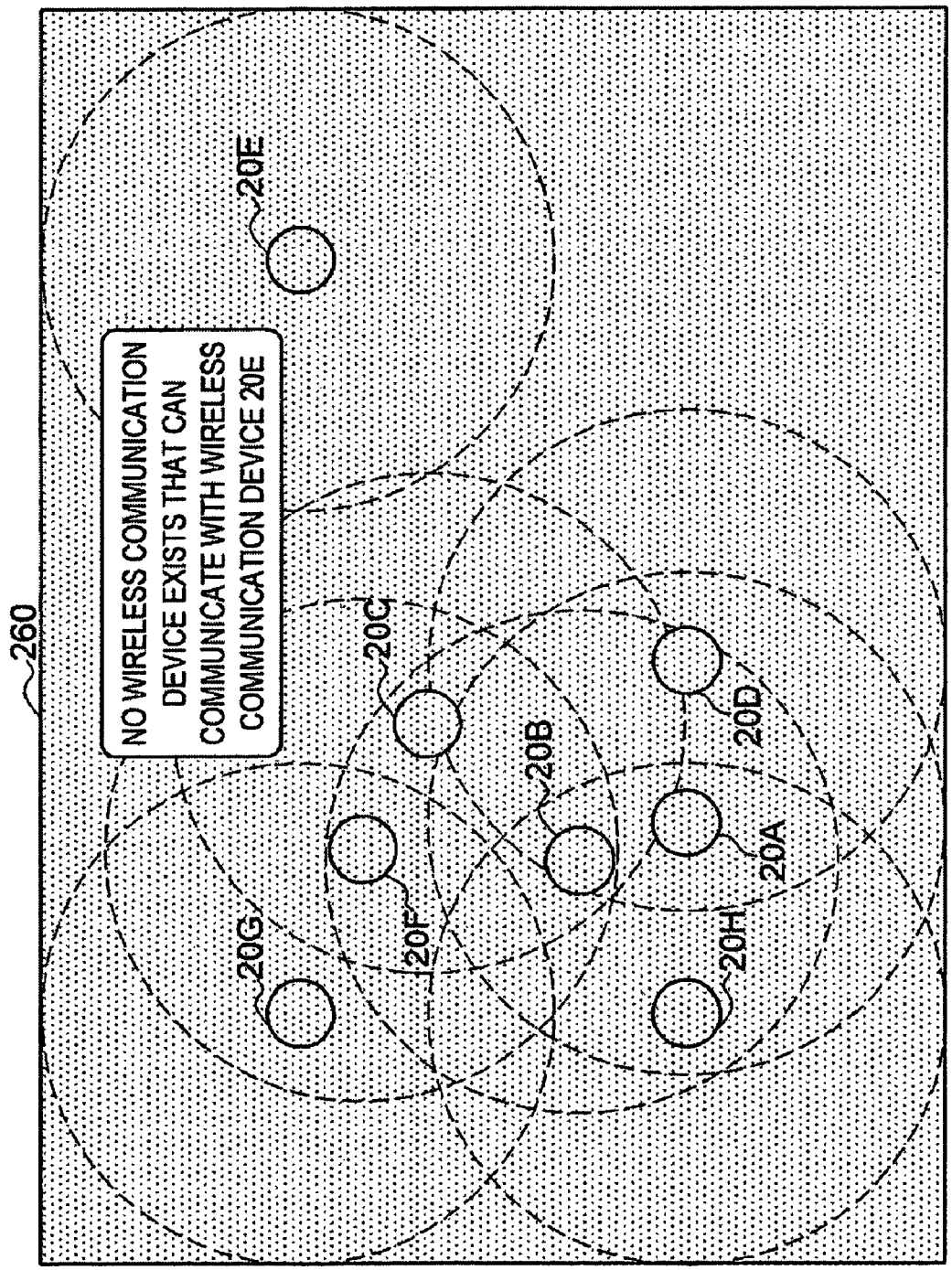
FIG. 11 is an explanatory view showing another example of a display screen displayed by a display portion.

FIG. 11 is an explanatory view showing another example of the display screen displayed by the display portion 260. In the example shown in FIG. 11, the number of communication-possible devices for the wireless communication device 20E is 0, and therefore the evaluation portion 252 evaluates that the communication state of the wireless communication device 20E corresponds to the first row of the communication state evaluation table. As a result, the display screen generation portion 256 sets the background color of the display screen to red and superimposes the message "no wireless communication device exists that can communicate with the wireless communication device 20E" on the display screen.

The display screen shown in FIG. 11 may be displayed on the display portion 260 of the wireless communication device 20E or a display device outside the mesh network. In the case where the display portion 260 of the wireless communication device 20E displays the display screen shown in FIG. 11, the display screen generation portion 256 may determine the displayed positions of the other wireless communication devices 20A to 20D and 20F to 20H based on the positional information of the other wireless communication devices 20A to 20D and 20F to 20H that are acquired when communicating with the other wireless communication devices 20A to 20D and 20F to 20H. On the other hand, in the case where a display device outside the mesh network displays the display screen shown in FIG. 11, the display device outside the mesh network may determine the displayed positions of the wireless communication devices 20A to 20H by acquiring the positional information of the wireless communication devices 20A to 20H through a given communication channel from the wireless communication devices 20A to 20H.

Figure 12:
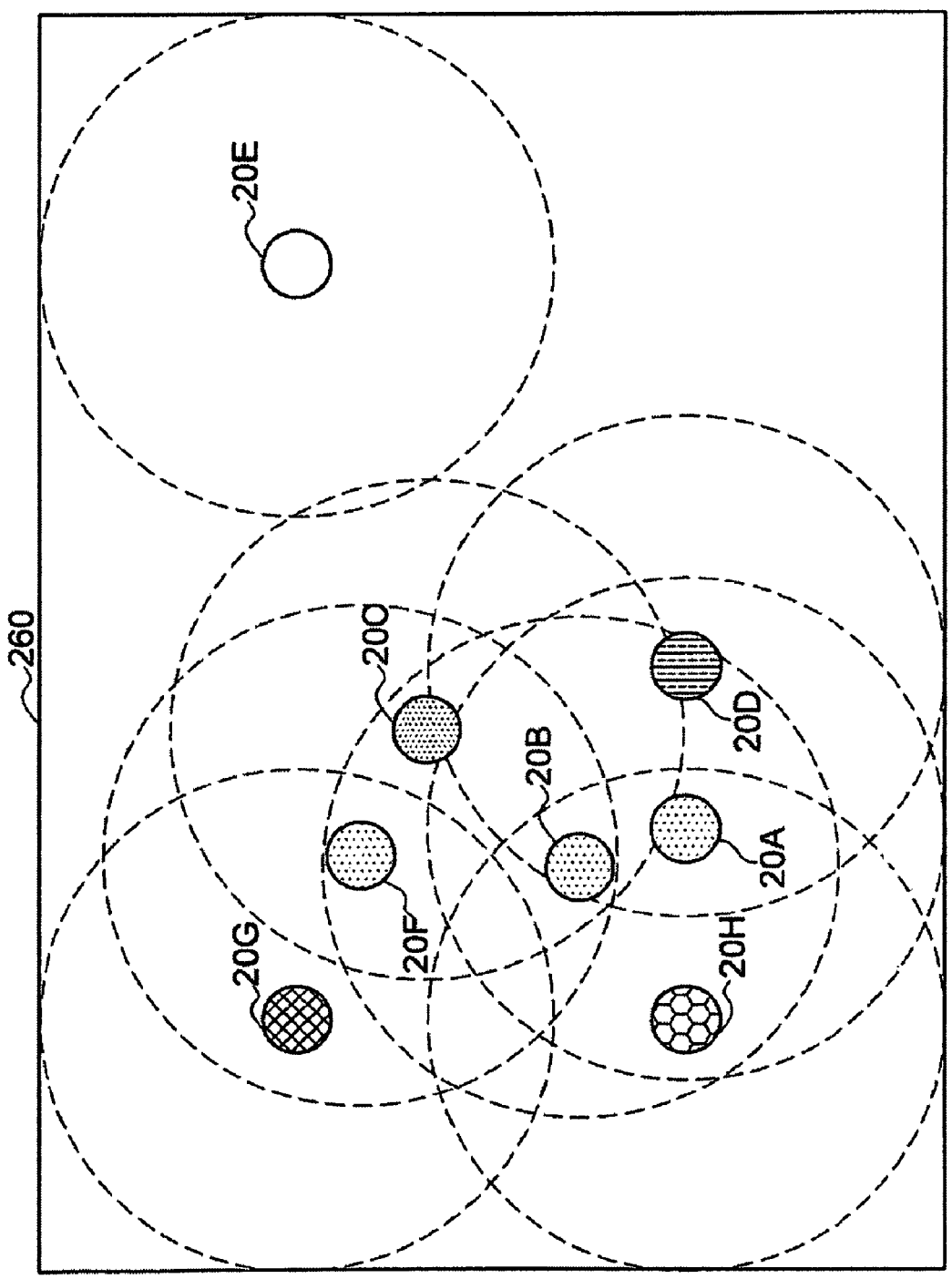
FIG. 12 is an explanatory view showing another example of a display screen displayed by a display portion.

FIG. 12 is an explanatory view showing another example of the display screen displayed by the display portion 260. As shown in FIG. 12, the display screen generation portion 256 of a given wireless communication device 20 may change the display color of each wireless communication device 20 on the display screen according to the communication state of each wireless communication device 20. In the example shown in FIG. 12, the wireless communication devices 20A, 20B, 20C and 20F are displayed by red, the wireless communication device 20D is displayed by yellow, the wireless communication device 20G is displayed by green, and the wireless communication device 20H is displayed by orange.

Figure 13:
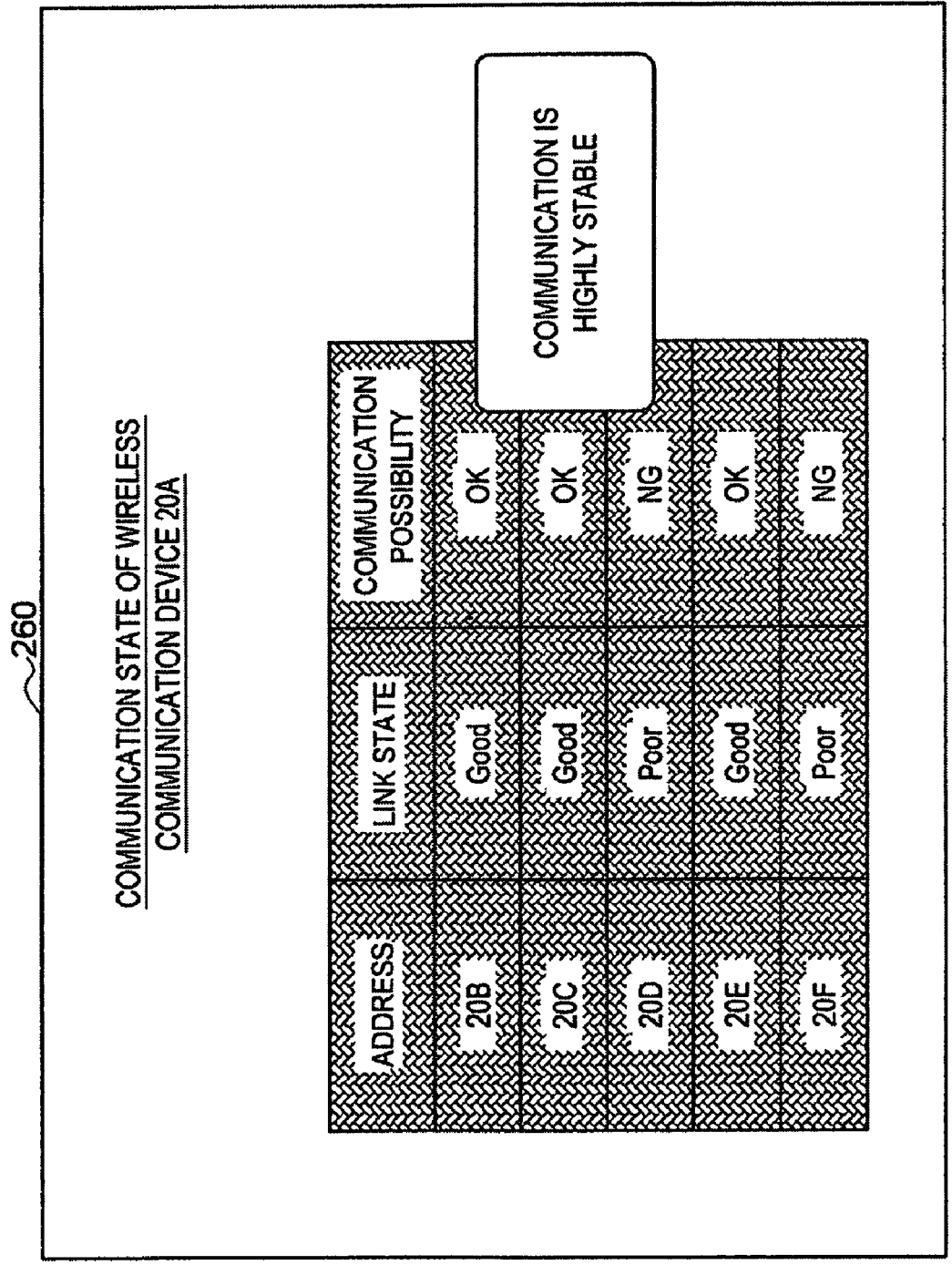
FIG. 13 is an explanatory view showing another example of a display screen displayed by a display portion.

FIG. 13 is an explanatory view showing another example of the display screen displayed by the display portion 260. As shown in FIG. 13, the display screen generation portion 256 of the wireless communication device 20A, for example, may superimpose the table indicating the relationship with the other wireless communication devices 20B to 20F and the message "communication is highly stable" on the display screen. In the example shown in FIG. 13, the communication state of the wireless communication device 20A corresponds to the second row from the bottom of the communication state evaluation table, and therefore the display screen generation portion 256 may set the color of the table indicating the relationship with the other wireless communication devices 20B to 20F to blue.

The case of superimposing the table indicating the relationship with the other wireless communication devices 20B to 20F, rather than the positional relationship of each wireless communication device 20, on the display screen as shown in FIG. 13 is effective when it is difficult for the wireless communication device 20A to acquire the positional relationship of the other wireless communication devices 20B to 20F.

(2-3) Operation of the Wireless Communication Device According to the First Embodiment The function of the wireless communication device 20 according to the first embodiment is described in the foregoing. In the following, the operation of the wireless communication device 20 according to the first embodiment is described with reference to FIG. 14.

Figure 14:
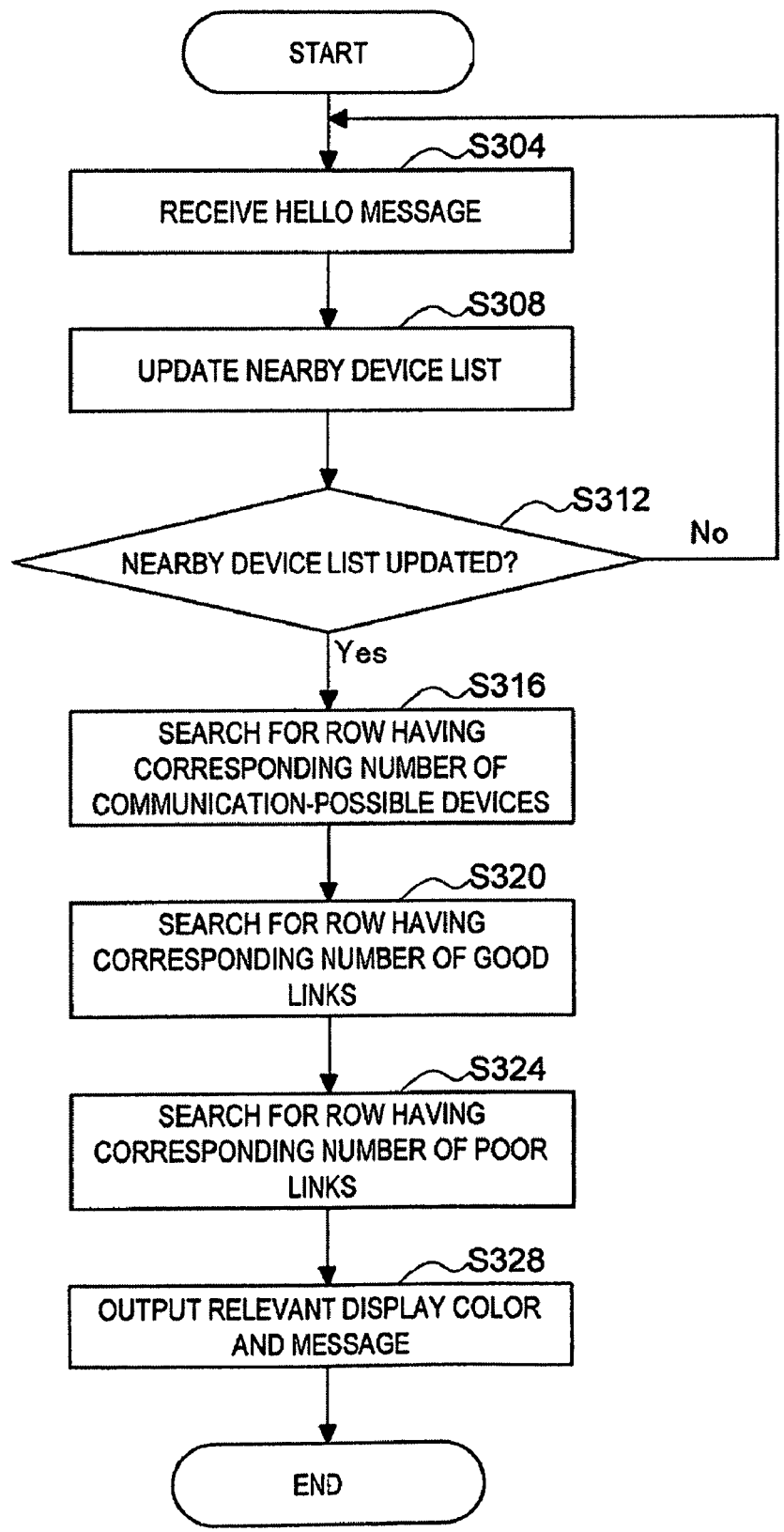
FIG. 14 is a flowchart showing the flow of the operation of the wireless communication device according to the first embodiment.

FIG. 14 is a flowchart showing the flow of the communication state notification method performed in the wireless communication device 20 according to the first embodiment. Referring to FIG. 14, when the communication portion 216 of the wireless communication device 20 receives the hello message (S304), the signal strength measurement portion 232, the reception rate calculation portion 236, the link state determination portion 240 and the communication possibility determination portion 244 update the nearby device list according to need (S308). The update of the nearby device list may be performed at regular intervals.

If the nearby device list is updated, the evaluation portion 252 searches for the row having the corresponding number of communication-possible devices in the communication state evaluation table (S316). Then, the evaluation portion 252 searches for the row having the corresponding number of Good links from the row determined to have the corresponding number of communication-possible devices in the communication state evaluation table (S320). Further, the evaluation portion 252 searches for the row having the corresponding number of Poor links from the row determined to have the corresponding number of Good links (S324).

After that, the display screen generation portion 256 generates the display screen that contains the information associated with the row that is found in the step S324, and the display portion 260 displays the display screen that is generated by the display screen generation portion 256 (S328).

As described in the foregoing, the wireless communication device 20 according to the first embodiment displays the communication state (nearby device state) of the wireless communication device 20 by means of abstraction such as a display color and a display message, thereby allowing a user to easily grasp the communication state of the wireless communication device 20.

(3) Wireless Communication Device According to the Second Embodiment

A wireless communication device 21 according to a second embodiment is described hereinafter with reference to FIGS. 15 and 16. The wireless communication device 21 of the second embodiment is different from that of the first embodiment in that it is capable of notifying a user of the communication state of the wireless communication device 21 by a sound in addition to a display screen.

FIG. 15 is a functional block diagram showing the configuration of the wireless communication device 21 according to the second embodiment. Referring to FIG. 15, the wireless communication device 21 includes a communication portion 216, a transmission signal generation portion 220, a GPS 224, a communication control portion 228, a signal strength measurement portion 232, a reception rate calculation portion 236, a link state determination portion 240, a communication possibility determination portion 244, a storage portion 248, an evaluation portion 252, a display screen generation portion 256, a display portion 260, an output sound generation portion 264, and a sound output portion 268.

The configurations of the communication portion 216, the transmission signal generation portion 220, the GPS 224, the communication control portion 228, the signal strength measurement portion 232, the reception rate calculation portion 236, the link state determination portion 240, the communication possibility determination portion 244, the storage portion 248, the display screen generation portion 256 and the display portion 260 are substantially the same as those in the wireless communication device 20 according to the first embodiment and not described hereinbelow.

The evaluation portion 252 evaluates the communication state of the wireless communication device 21 in the mesh network based on the nearby device list that is stored in the storage portion 248. Then, the display screen generation portion 256 generates a display screen corresponding to the evaluation result of the communication state by the evaluation portion 252, and the display portion 260 displays the display screen that is generated by the display screen generation portion 256.

Further, the output sound generation portion 264 generates an output sound corresponding to the evaluation result of the communication state by the evaluation portion 252, and the sound output portion 268 outputs the output sound that is generated by the output sound generation portion 264. Thus, the display screen generation portion 256, the display portion 260, the output sound generation portion 264 and the sound output portion 268 have a function as a notification portion that provides a notification corresponding to the evaluation result of the communication state by the evaluation portion 252.

Generating the output sound may be reading data in analog or digital format of the output sound that is stored in advance and, if it is data in digital format, converting it into analog format.

Specifically, the wireless communication device 21 according to the second embodiment notifies a user of the communication state of the wireless communication device 21 based on the communication state determination table shown in FIG. 16.

FIG. 16 is an explanatory view showing a specific example of the communication state determination table according to the second embodiment. Referring to FIG. 16, in the communication state determination table according to the second embodiment, a display color, a display message and information about a sound are associated with the number of communication-possible devices and the number of devices at RSSI>50(db/m).

For example, if the evaluation portion 252 evaluates that the communication state of the wireless communication device 21 corresponds to the third row of the communication state determination table according to the second embodiment, the output sound generation portion 264 generates a sound of the sound pattern 2, which is two bleeps, and the sound output portion 268 outputs the sound that is generated by the output sound generation portion 264.

Such a configuration can notify a user of the communication state of the wireless communication device 21 by a sound, and therefore it is not always necessary to place the display portion 260 in the wireless communication device 21, thereby enabling simplification of the configuration of the wireless communication device 21. Further, although it is difficult for a user to check the display portion 260 of each wireless communication device 21 at the same time, it is possible to check the sound output from the sound output portion 268 of each wireless communication device 21 at the same time, which is advantageous.

(4) Summary

As described in the foregoing, according to the present embodiment, the evaluation portion 252 evaluates the communication state of the wireless communication device 20 in the mesh network based on the nearby device list that is stored in the storage portion 248, and the display portion 260 displays the display screen corresponding to the evaluation result of the communication state of the wireless communication device 20. Therefore, the wireless communication device 20 allows a user of the wireless communication device 20 to grasp the communication state of the wireless communication device 20. The wireless communication device 20 thereby contributes to the appropriate placement of each wireless communication device 20 in the mesh network by a user.

It should be understood by those skilled in the art that various modifications, combinations, sub-combinations and alterations may occur depending on design requirements and other factors insofar as they are within the scope of the appended claims or the equivalents thereof.

For example, although the case where the communication state of each wireless communication device 20 is notified by changing the display color of each wireless communication device 20 is described in the first embodiment, the present invention is not limited thereto. For example, a character such as a person or an animal may be displayed at a given position on the display screen, and the facial expression or the movement of the character may be changed according to the communication state of each wireless communication device 20. Further, the displayed size of each wireless communication device 20 on the display screen may be changed according to the communication state of each wireless communication device 20.

Although the case where the communication state is evaluated using the received signal strength and the reception success rate of the hello message as a history of receiving the hello message is described in the above embodiment, the present invention is not limited thereto. For example, the evaluation portion 252 may evaluate the communication state of each wireless communication device 20 using the reception interval of the hello message. Although the hello message is transmitted periodically, the reception interval of the hello message varies if the link sate is not suitable. Thus, the evaluation portion 252 may evaluate that the communication state of each wireless communication device 20 is more suitable as the variation of the reception interval of the hello message is smaller.

Further, it is not necessary to perform each step in the processing of the wireless communication devices 20 and 21 in chronological order according to the sequence shown in the flowchart. For example, each step in the processing of the wireless communication devices 20 and 21 may include the processing that is executed in parallel or individually (e.g. parallel processing or object processing).

Furthermore, it is possible to create a computer program that causes the hardware such as the CPU 201, the ROM 202 or the RAM that are included in the wireless communication devices 20 and 21 to perform the equal function to each configuration of the wireless communication devices 20 and 21 described above. Further, a storage medium that stores such a computer program may be provided. Furthermore, each functional block which is shown in the functional block diagram of FIG. 4 may be implemented by hardware, thereby achieving the series of processing on hardware.

What is claimed is:

1. A wireless communication device forming an autonomous distributed wireless network by intermittently transmitting and receiving a predetermined communication management signal, comprising:
    a reception portion to receive the communication management signal;
    an evaluation portion to evaluate a communication state of the wireless communication device in the wireless network based on a history of receiving the communication management signal by the reception portion; and
    a notification portion to provide a notification corresponding to an evaluation result of the communication state by the evaluation portion,
    wherein the evaluation portion determines a connection relationship with each peripheral wireless communication device based on the history of receiving the communication management signal transmitted from each peripheral wireless communication device by the reception portion.

2. The wireless communication device according to claim 1, wherein
    the evaluation portion evaluates that the communication state is more suitable as a reception success rate of the communication management signal from each peripheral wireless communication device by the reception portion is higher.

3. The wireless communication device according to claim 1, wherein
    the evaluation portion evaluates that the communication state is more suitable as a variation of an interval of receiving the communication management signal transmitted from each peripheral wireless communication device by the reception portion is smaller.

4. The wireless communication device according to claim 1, wherein
    the evaluation portion evaluates that the communication state is more suitable as the number of peripheral wireless communication devices with the connection relationship determined to satisfy a predetermined condition is larger.

5. The wireless communication device according to claim 4, wherein
    the evaluation portion evaluates that the communication state of the wireless communication device is abnormal if the number of peripheral wireless communication devices with the connection relationship determined to satisfy a predetermined condition exceeds a predetermined number.

6. The wireless communication device according to claim 1, wherein
the notification portion generates a display screen corresponding to the evaluation result of the communication state by the evaluation portion.

7. The wireless communication device according to claim 6, wherein
the display screen contains a display indicating the wireless communication device and a peripheral wireless communication device, and
the notification portion changes a color of the display indicating the wireless communication device corresponding to the evaluation result of the communication state by the evaluation portion.

8. The wireless communication device according to claim 6, wherein
the notification portion changes a background color of the display screen corresponding to the evaluation result of the communication state by the evaluation portion.

9. The wireless communication device according to claim 1, wherein
the notification portion outputs a sound corresponding to the evaluation result of the communication state by the evaluation portion.

10. The wireless communication device according to claim 1, further comprising:
a storage medium to store the history of receiving the communication management signal by the reception portion.

11. A communication state notification method performed in a wireless communication device forming an autonomous distributed wireless network by intermittently transmitting and receiving a predetermined communication management signal, comprising the steps of:
receiving the communication management signal;
evaluating a communication state of the wireless communication device in the wireless network based on a history of receiving the communication management signal; and
providing a notification corresponding to an evaluation result of the communication state,
wherein the evaluation determines a connection relationship with each peripheral wireless communication device based on the history of receiving the communication management signal transmitted from each peripheral wireless communication device.

12. A wireless communication system including a plurality of wireless communication devices forming an autonomous distributed wireless network by intermittently transmitting and receiving a predetermined communication management signal, each wireless communication device comprising:
a reception portion to receive the communication management signal;
an evaluation portion to evaluate a communication state of the wireless communication device in the wireless network based on a history of receiving the communication management signal by the reception portion; and
a notification portion to provide a notification corresponding to an evaluation result of the communication state by the evaluation portion,
wherein the evaluation portion determines a connection relationship with each peripheral wireless communication device based on the history of receiving the communication management signal transmitted from each peripheral wireless communication device by the reception portion.

13. A program causing a computer to function as a wireless communication device forming an autonomous distributed wireless network by intermittently transmitting and receiving a predetermined communication management signal, the wireless communication device comprising:
an evaluation portion to evaluate a communication state of the wireless communication device in the wireless network based on a history of receiving the communication management signal; and
a notification portion to provide a notification corresponding to an evaluation result of the communication state by the evaluation portion,
wherein the evaluation portion determines a connection relationship with each peripheral wireless communication device based on the history of receiving the communication management signal transmitted from each peripheral wireless communication device.

* * * * *